United States Patent

[11] 3,611,075

[72] Inventor Wesley N. Lindsay
 San Jose, Calif.
[21] Appl. No. 46,261
[22] Filed June 15, 1970
[45] Patented Oct. 5, 1971
[73] Assignee International Telephone and Telegraph Corporation
 New York, N.Y.

[54] HIGH-FREQUENCY VARIABLE VACUUM CAPACITOR
 10 Claims, 1 Drawing Fig.

[52] U.S. Cl. .................................................. 317/245
[51] Int. Cl. .................................................. H01g 5/04
[50] Field of Search .......................................... 317/245;
 1/244

[56] References Cited
 UNITED STATES PATENTS
 3,496,430 2/1970 Collis ........................... 317/245

Primary Examiner—E. A. Goldberg
Attorneys—C. Cornell Remsen, Jr., Walter J. Baum, Paul W. Hemminger, Charles L. Johnson and Thomas E. Kristofferson ABSTRACT: A vacuum or hermetically sealed variable capacitor in which a set of floating movable concentric cylindrical plates are insulated from but mechanically connected to the axially movable shaft and bellows assembly. The fixed plates are divided into two concentric sets of plates, one generally central and closest to the axial centerline of the device and the other radially spaced and generally adjacent to the housing. The insulating (preferably ceramic) central body section is opposite the area of axial movement of the movable plates in the substantially unmeshed position to obtain low minimum capacitance. Unique support and isolation of the fixed plates permits short connections to the two fixed plate sets, both from one end, to form the terminals of the unit in coaxial form. Accordingly, the capacitor is particularly adapted for high-frequency operation, in that lead inductance is low. The terminal of the capacitor assembly can be integral with a coaxial transmission line which itself may be a circuit element in a system.

PATENTED OCT 5 1971
3,611,075
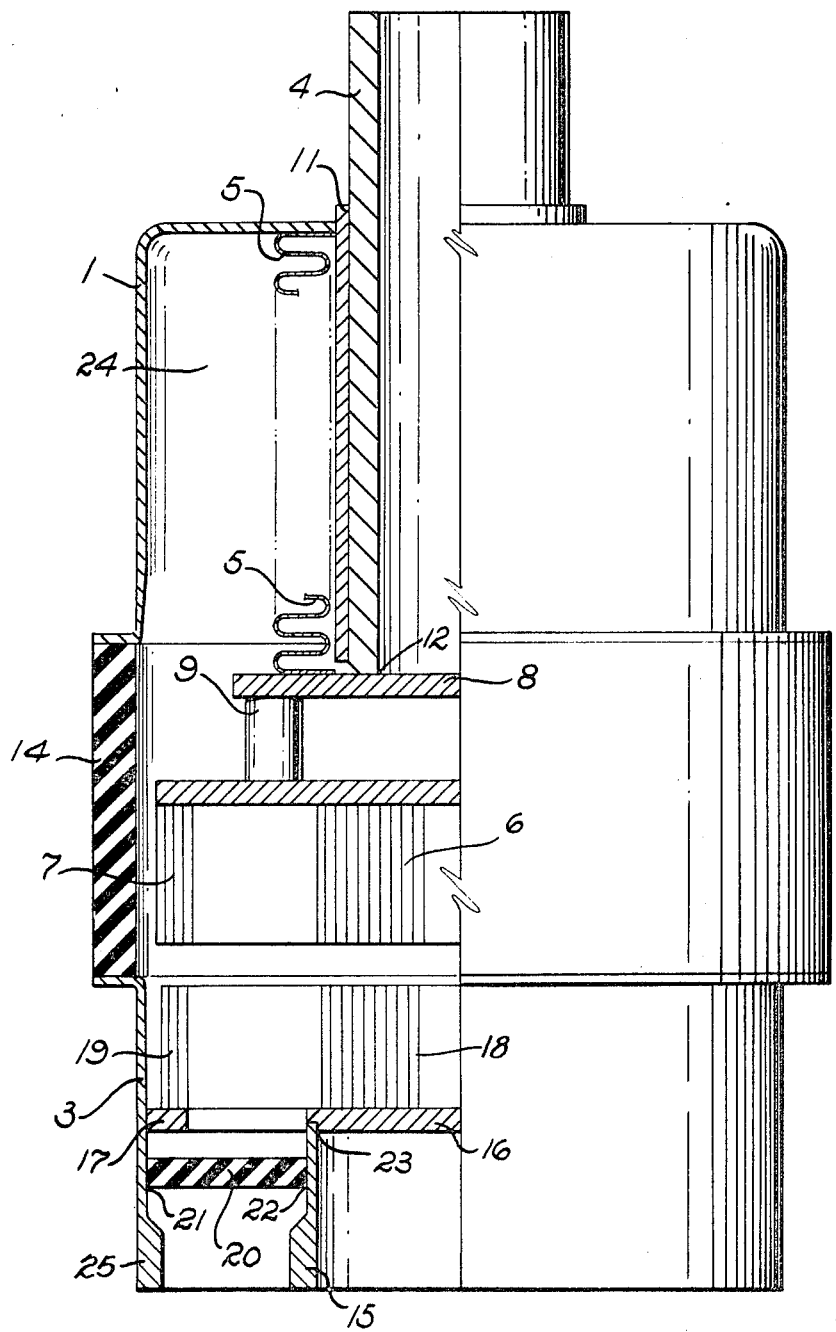
INVENTOR.
WESLEY N. LINDSAY
BY William F. O'Neil
AGENT.

HIGH-FREQUENCY VARIABLE VACUUM CAPACITOR

BACKGROUND OF THE INVENTION

1. Field of the Invention

The present invention relates to vacuum or hermetically sealed variable capacitors, and more particularly to capacitors of that type particularly adapted for high frequency use.

2. Description of the Prior Art

Various forms of variable capacitors constructed in hermetically sealed envelopes are extant. These are often constructed as vacuum capacitors, i.e., the plates thereof reside in an evacuated chamber for electrical and environmental reasons which are well known.

Typical of one type of prior art variable vacuum capacitor is the device shown in U.S. Pat. No. 2,511,338. In that reference, typical fixed and movable plate assemblies are illustrated. A glass envelope encloses the evacuated chamber and a metal bellows sealed to the glass envelope or to a header which itself is sealed to the glass envelope serves to permit mechanical motion to axially mesh and withdraw a set of variable plates with respect to a set of fixed plates. Another prior art patent, namely, U.S. Pat. No. 3,257,590, illustrates a vacuum variable capacitor in a somewhat more modern form using a ceramic insulating body and metallic end bells or members hermetically braised thereto.

It has been considered normal in such capacitors to provide the connections thereto at or adjacent to opposite axial ends of the envelope. The construction of those prior art devices usually involves the metal bellows (in addition to other internal parts) in the circuit path leading from the external connection to the movable plates. The result is that the capacitor resonates at a relatively low frequency due to inherent inductive effects and uncontrollable stray capacitance and is therefore not useable in VHF or UHF communications transmitting equipment.

Attempts to bypass the bellows by means of spring bypass fingers introduce contact reliability problems and do not entirely eliminate current path circuitry within the device.

Although prior art split-stator capacitor construction offers well understood advantages, this expedient has not produced commercial success in vacuum variable capacitors because prior art designs do not permit adjustment to sufficiently low minimum capacitance.

The manner in which the present invention overcomes the disadvantages and objections of the prior art for VHF and UHF use will be understood as this specification proceeds.

SUMMARY

In accordance with the aforementioned and otherwise known disadvantages and shortcomings of the prior art, it may be said to be the general objective of the present invention to produce a vacuum or hermetically sealed type variable capacitor unit which is adapted for use at higher frequencies than heretofore possible in devices of the type.

The accomplishment of the general objective of the present invention depends upon minimization of the length of the current paths leading to the capacitor plates, since, as has been pointed out, lengthy and circuitous paths within the device introduce substantial inductive effects and therefore operate to establish a low self-resonant frequency.

The present invention is based on the use of a short length of coaxial line shunted by a capacitor at its open end. Such a combination will offer capacitive reactance at relatively high frequencies, as will be shown and described in detail.

A common construction for transporting high frequency power advantageously is the so-called coaxial transmission line. According to the well known theory of operation of such transmission lines, an open ended line per se offers capacitive reactance when less than one-quarter wavelength long and becomes resonant when its length is one-quarter wavelength. Transmission lines of either the open ended or closed ended type are used as resonant circuits and circuit elements in certain VHF and UHF power equipment. While it is obviously possible to construct transmission line circuit elements, making them variable requires reliable noise-free slider type tuning of the length of the line. The practical realization of such devices is difficult and expensive.

The present invention is intended to provide the capacitive termination for a predetermined coaxial transmission line, or conversely to provide optimum circuit terminals for a power capacitor. Its terminal construction is particularly adapted to this purpose in that the said terminals are actually extensions of a predetermined coaxial transmission line. The structure may, in fact, be thought of as a vacuum capacitor device which is integrally constructed into the said transmission line. Accordingly, as illustrated, the terminal portions may be thought of as a truncated portion of the said integral coaxial transmission line.

Concerning the general theory of the operation of a capacitive terminated coaxial line, consider the expression for the input impedance looking into the end of the line opposite the capacitive termination, as follows:

$$Z_i = Z_0 \frac{\frac{Z_T}{Z_0} + \tan 2\pi \frac{l}{\lambda}}{1 + j\frac{Z_T}{Z_0} \tan 2\pi \frac{l}{\lambda}} \qquad \text{Equation I}$$

where $Z_0$ is the characteristic impedance of the line, $Z_T$ is the termination impedance, $j$ is the complex operator, $\lambda$ the wavelength of the impressed signal and $l$ the length of the transmission line.

When the line is short in respect to wavelength, the equation simplifies to:

$$Z_i = Z_T \qquad \text{Equation II}$$

In that case, $Z_T$ is substantially entirely capacitive reactance.

The device, according to the present invention, being adapted for construction as an integral transmission line and vacuum variable terminating capacitor, achieves the necessary high resonant frequency and minimum stray shunting capacitance requirements. Inspection of Equation II indicates that, in the unique construction of the present invention, the performance of the overall combination will be dependent upon the characteristics of the terminating capacitor itself. Inductive effects are substantially eliminated as a factor tending to reduce the resonant frequency of the device.

In a variable vacuum or hermetically sealed capacitor, problems of construction and alignment are critical, especially since the device may be subjected to severe shock and vibration in the environment of its application. These practical factors, as well as the theoretical considerations aforementioned, have been considered in the development of the capacitor according to the present invention. Basically, the capacitor itself is a split-stator coaxial type, in which the two fixed plate sets are optimally connected to the transmission line inner and outer conductors. Two coaxial cylindrical plate sets are mounted to a plate which has a diameter equal to the inner coaxial line conductor diameter, and to a conductive annulus or annular disc conductively adjoining the inside wall of the coaxial transmission line outer conductor, respectively. The said outer coaxial conductor extends and becomes a part of the body housing of the vacuum capacitor. Within the midsection of the capacitor assembly, beginning approximately at the inner axial extremity of the fixed plates, the capacitor assembly housing becomes a tubular ceramic body member. The movable plates are mounted on standoff insulators from the shaft assembly and travel essentially alongside the said ceramic body member. The movable plates mesh with both fixed plate sets simultaneously and thus operate in an electrically "floating" manner, similar to the rotor of the ordinary split-stator capacitor.

Other features, advantages, and novel aspects of the present invention will be described and understood as the detailed description of the embodiment illustrated proceeds.

BRIEF DESCRIPTION OF THE DRAWING

A single figure drawing is presented, illustrating a half-sectioned view of a capacitor/coaxial feed line terminal combination in accordance with the present invention.

DESCRIPTION OF THE PREFERRED EMBODIMENTS

Referring now to the drawing, it will be noted that the FIGURE is sectioned only to the left of the axial center line, since it is to be understood to be entirely symmetrical about the said axial centerline.

The external housing of the capacitor assembly will be seen to include the metallic endbell 1, the ceramic central body portion 2, and the metallic end sleeve 3 which is, in reality, an extension of the outer conductor of the coaxial transmission line with which the capacitor is associated. Typically, the said coaxial transmission line, if required to be of greater length, is joined to the bottom of the figure, as illustrated. Parts 15 and 25 will, therefore, be understood to be the inner and outer conductors of the said coaxial line, and considered otherwise, the line itself may be regarded as simply a downward extension of these generally tubular parts. The fixed plates of the illustrated capacitor assembly comprise the plates 18 and 19, both of which are fabricated from a plurality of progressively larger diameter cylindrical "cans," all of which are mutually concentric or coaxial and symmetrically disposed about the axial center line. The use of this plate construction is, per se, well known. Normally, the two capacitor sections thus formed in cooperation with the moving plates 6 and 7 to be described, form a pair of variable capacitors in series, of substantially equal capacitance exhibiting equal rates of capacitance change as a function of the mesh of the said variable or moving plates. Obviously, the larger diameter plates 19 will be fewer in number than the smaller diameter plates 18 to satisfy the aforementioned equal capacitance criterion. The same applies to the moving plates 6 and 7.

The annulus or annular disc 17, which supports the plates 19 is conductively bonded (as for example by hermetic brazing) to the metallic shell 3. The same applies where the support disc 16 for the plates 18 joins the inner coaxial conductor 15 at 23. The plates 18 are similarly conductively bonded at their ends to the plate 16 and the same applies to the plates 19 with respect to the conductive annulus or annular disc 17. Movable plates 6 and 7 are similarly conductively bonded to a base plate or support plate 8, the conductive qualities of which connect the plates 6 and 7 electrically. An additional metallic plate 10 is attached to plate 8 through standoff insulators typically 9. These insulators can be of ceramic material similar to that used at 2 and 20, and are at least three in number to provide an adequate and stable mechanical connection between plates 8 and 10.

A journal or tubular bearing 11 is bonded at the upper end to the metallic end bill 1 to provide lateral stability to the hollow shaft member 4, which is controllable externally. Translation of the shaft member 4 thus produces axial translation of the entire moving plate assembly, since the said shaft 4 is bonded to the plate 10 at 12. The usual axially extendable metal bellows 5 is bonded to the upper inside portion of the endbill 1 and at the plate 10.

Concerning the bonding of ceramic insulating members to the adjoining metallic parts, the appropriate techniques will be understood to be well known in this art. Further reference to appropriate techniques will be found in U.S. Pat. application, Ser. No. 820,451, now Pat. No. 3,541,405, filed Apr. 30, 1969, entitled "Variable Vacuum Capacitor With Optimum Movable Plate Support, and Method of Manufacturing Same," and assigned to the same assignee as the instant application.

Suffice it here to say that hermetic bonding of the ceramic tubular body part 2 at 13 and 14 is effected and also the closure of the bottom of the interior vessel of the capacitor assembly is effected by a similar bonding at 21 and 22, whereby the annular ceramic disc 20 acts as an insulating spacer for the coaxial conductors 15 and 25, while also providing hermetic closure at that point. In accordance with the foregoing, it will be appreciated that a rigid hermetically sealed structure is provided, whereby the interior chamber generally at 24 may be evacuated so that the capacitor assembly operates in a vacuum. Although it is not a requirement for practice of the present invention that the interior of the capacitor assembly vessel be evacuated, the advantages of vacuum capacitors per se are well understood, and it is therefore presumed that the assembly would normally be constructed and operated as a vacuum capacitor. The usual tubulation provided for evacuation (which is subsequently sealed during the manufacturing process) has been omitted from the drawing, however, since it is not directly concerned with the present invention. The prior art very well explains such expedients as the so-called tubulation and the processes for manufacture and evacuation of vacuum capacitors.

It will be noted that undercuts 26 and 27 are illustrated in the walls of the coaxial transmission line conductors 15 and 25. As a design matter, such an expedient may be applied as an impedance transition device in passing from the characteristic impedance of the transmission line into the termination capacitive loading provided by the plates 18 and 19 in cooperation with the moving plates 6 and 7. However, such undercuts are not a necessary part of the construction of the present invention.

It will be noted that the movable plates 6 and 7 are carefully isolated so that stray capacitance from them to parts of the housing or other functional parts does not act to extraneously increase the minimum effective terminal capacitance which can be provided. The standoff insulators 9 participate in these precautions, and additional isolation is provided by the fact that the said movable plates in their unmeshed, or partially meshed, positions, face the ceramic body member 2 laterally, rather than metallic parts of the housing.

The term "cylincrical" is used herein in the broad geometric context with reference to the capacitor plates and therefore refers to a surface generated by a straight line moving parallel to another fixed straight line. Accordingly, the term embraces plate configurations other than circular cylinders and includes the spiral plate configuration.

It will be evident to those skilled in this art that various modifications of the structure described are possible within the spirit of the invention. Accordingly, it is not intended that the scope of the present invention should be limited by the drawing and the description presented, these being illustrative only.

What is claimed is:

1. In a hermetically sealed variable capacitor assembly having fixed and movable sets of coaxial cylindrical plates within a housing, said housing having generally metallic shell members at control and connection ends thereof and an insulating midsection between said shell members, said plates being interleavable in response to axial translation of a shaft member protruding from said control end, the combination comprising:

support means conductively interconnecting all of the plates in said movable set and mechanically connecting said plates to said shaft through electrical insulating means thereby to produce an electrically floating set of movable plates;
 means separating said fixed plates into first and second electrically independent subsets, said first subset including a plurality of said cylindrical plates spaced radially outward from the axis of said plates and said second set being radially offset from the outer perimeter of said first plates and located adjacent the inner perimeter of said housing, said separating means comprising first plate subset mounting means for supporting and conductively interconnecting said first plate subset at the axially outer edges thereof, whereby a direct external electrical connection may be made to said first plate subset at said connection end of said housing, and second plate mounting means for supporting and conductively interconnecting said second plate subset at the axially outer end thereof, whereby a direct external connection may be made to said second plate subset at said connection end of said housing.

2. A variable capacitor assembly enclosed in a generally tubular hermetically sealed housing, said capacitor including a plurality of fixed concentric cylindrical radially spaced conductive plates mounted generally concentric with the axis and adjacent one end of said tubular housing, and a corresponding plurality of movable plates of substantially the same character mounted to an axially extending shaft member and adapted to mesh with said fixed plates in response to axial translation of said shaft member, comprising the combination of:

means including a conductive shell forming said housing at said connection end of said housing adjacent said fixed plates;
means separating said fixed plates into independent inner and outer electrically separate coaxial plate sets, said means comprising a conductive annulus having its outer perimeter conductively attached to the inside surface of said conductive shell, said annulus having a radial dimension between its inner and outer tangents sufficient to support said outer fixed plates in conductive attachment thereto, and means comprising a conductive disk of diameter sufficient to support said inner plates in conductive attachment thereto;
a pair of capacitor terminals, one integrally formed by an extension of said conductive shell beyond the sealed portion of said capacitor assembly and the other extending from said conductive disk in the form of a hollow tube, thereby to provide connections of minimal length and circuitry within said housing;
and support means for securing said movable plates to said shaft, said support means including a base plate supporting said movable plates in conductive attachment thereto, and insulating means mechanically joining said base plate to said shaft member.

3. The invention set forth in claim 1, further defined in that said first plate mounting means comprises the closed end of the inner conductor of a coaxial transmission line, the plates of said first subset being conductively bonded to said closed end at said outer edges of said plates, thereby to provide an external electrical connection for said first plate subset; and said second plate mounting means comprises an annular conductive member conductively bonded along one face to the edges of said second plate subset, said annular conductive member being conductively bonded along its perimeter to the inside of said shell member at said connection end, said shell thereby to provide an external electrical connection for said second plate subset in the form of the outer conductor of said coaxial transmission line.

4. Apparatus according to claim 3 including an annular insulating member bonded along its inner and outer edges to the outer perimeter of said inner coaxial conductor and the inner perimeter of said shell member, respectively, thereby to complete the closure of said connection end.

5. Apparatus according to claim 2 in which said shell member is defined as being metallic, and including an annular insulating member of ceramic material filling the space between said coaxial line inner conductor and the inside wall of said shell member thereby to provide closure of said tubular housing at said end adjacent said fixed plates at a predetermined axial location along said cylindrical sidewall.

6. Apparatus according to claim 5 in which said tubular housing also includes a control end metallic shell through which said axially extending shaft member extends and an intermediate insulating body member bonded between said control end metallic shell and said metallic shell forming said housing at the end adjacent said fixed plates, said insulating body member extending opposite a substantial portion of the axial travel range of said movable plates, thereby to minimize the movable plate to metal shell stray capacitance.

7. Apparatus according to claim 2 in which said insulating means joining said base plate of said movable plates to said shaft member comprises at least three standoff insulator posts joined on one end to said base plate in laterally spaced relationship, and additional structural means are provided for mechanically joining the other ends of said insulator posts to said shaft means.

8. The invention set forth in claim 2 in which said inner and outer electrically separate coaxial plate sets are each of substantially equal capacitance at full mesh, whereby the capacitance of said capacitor at any degree of mesh is substantially equal to half that of each plate set.

9. Apparatus according to claim 6 in which said insulating body and said annular insulating member are hermetically bonded to the adjacent metallic parts and an extendable metal bellows surrounds said shaft member and is hermetically bonded inside the control end of said control end metallic shell and to said additional structural means for mechanically joining said insulator posts to said shaft means.

10. A variable capacitive termination for a coaxial transmission line which includes tubular inner and outer conductors, comprising:

a first set of fixed cylindrical capacitor plates conductively mounted on the closed end of said tubular inner conductor, said plates being coaxial with the longitudinal axis of said coaxial line;
a second set of fixed cylindrical capacitor plates, coaxial with said first set and mounted on an annular conductive disk forming a shoulder attached to said outer conductor;
an axially movable set of plates arranged to be simultaneously interleaved with said first and second sets of fixed plates, thereby to form said variable capacitive termination;
and means including an annular insulating coaxial line spacer hermetically bonded between said inner and outer conductors and a hermetically sealed envelope bonded to said outer conductor and enclosing said plates.